(12) United States Patent
Margerie

(10) Patent No.: US 6,572,481 B1
(45) Date of Patent: Jun. 3, 2003

(54) CONSTANT VELOCITY JOINT AND MECHANICAL TRANSMISSION MEMBER THEREFOR

(75) Inventor: Michel Margerie, Vetheuil (FR)

(73) Assignee: GKN Automotive GmbH (DE)

( * ) Notice: Subject to any disclaimer, the term of this patent is extended or adjusted under 35 U.S.C. 154(b) by 0 days.

(21) Appl. No.: 09/890,730
(22) PCT Filed: Feb. 23, 2000
(86) PCT No.: PCT/FR00/00452
§ 371 (c)(1),
(2), (4) Date: Aug. 3, 2001
(87) PCT Pub. No.: WO00/50782
PCT Pub. Date: Aug. 31, 2000

(30) Foreign Application Priority Data

Feb. 24, 1999 (FR) .............................................. 99 02309

(51) Int. Cl.$^7$ .............................................. F16D 3/205
(52) U.S. Cl. ........................................ 464/111; 464/123
(58) Field of Search ................................ 464/111, 123, 464/124, 132, 905

(56) References Cited

U.S. PATENT DOCUMENTS 6,168,528 B1 * 1/2001 Ishijima et al. ............. 464/111

FOREIGN PATENT DOCUMENTS

| DE | 44 08 812 A1 | 9/1994 |
|---|---|---|
| DE | 44 07 346 A1 | 6/1995 |
| DE | 198 22 464 A1 | 1/1999 |
| EP | 0 532 992 A2 | 3/1993 |
| FR | 2 701 741 A1 | 8/1994 |
| GB | 2 176 871 A | 1/1987 |

* cited by examiner

Primary Examiner—Greg Binda

(57) ABSTRACT

The invention concerns a constant velocity tripod joint for motor vehicle transmission systems comprising a male element (2) including several branches (4), a female element (8) defining for each branch a pair of tracks (9A, 9B), symmetrical with respect to a plane (P), and, mounted on each branch, a mechanical transmission member (11) comprising an outer roller (12) designed to run on one of the corresponding tracks. Each track comprises a central zone (14A, 14B) having a rectilinear transverse profile and inclined at an angle a relative to the plan (P) and a bearing (15A, 15B) for maintaining the roller radially. Each roller has a peripheral surface whereof the central zone (31) is conical and matching the central zones of the tracks, and a front surface (32) adapted to be urged into contact more or less perpendicularly with said bearing surfaces of the tracks under the effect of a driving torque. The invention is applicable to constant velocity tripod joints for transmission systems in motor vehicles.

12 Claims, 1 Drawing Sheet

CONSTANT VELOCITY JOINT AND MECHANICAL TRANSMISSION MEMBER THEREFOR

BACKGROUND OF THE INVENTION

The present invention relates to a constant-velocity universal joint.

The invention applies in particular to tripot constant-velocity joints for motor vehicle transmissions.

A tripot constant-velocity joint of this kind generally comprises a male element with ternary symmetry, or tripod, secured to a first rotating shaft, and a female element with ternary symmetry, or bell housing, secured to a second rotating shaft.

In an embodiment known from document FR-A-2 701 741, each mechanical transmission member comprises an internal ring, arranged inside the external roller, and which swivels and slides about a spherical bearing surface of the corresponding arm.

Each mechanical transmission member also comprises means of coupling the internal ring and the external roller to allow their relative pivoting about a common axis of revolution. The coupling means allow only a limited relative translational movement between the internal ring and the external roller along the common axis of revolution.

In general, the external roller comprises a peripheral surface of torus-shaped cross section. The, transverse profile of each track is in the form of a broken arc which is symmetric with respect to a mid-plane orthogonal to the corresponding longitudinal and radial plane.

Such a structure, through the rolling of the external rollers along one of the tracks of the corresponding pair, allows the constant-velocity joint to operate at an angle of misalignment between the two rotating shafts when a driving torque is applied.

During such operation under torque, each peripheral surface of an external roller bears against a track of the corresponding pair of tracks, and there is a small clearance between this peripheral surface and the other track of said pair. In addition, each arm is given a back and forth translational movement with respect to the corresponding pair of tracks parallel to the corresponding longitudinal and radial plane. This back and forth movement in the longitudinal and radial plane is due, on the one hand, to the inclination of the arm and, on the other hand, to the orbital movement, known as the offset, of the tripod at a frequency which is three times the rotational speed, as is well known in the art.

Such a back and forth movement of the arms gives rise, in the case of each external roller, to a back and forth rocking movement of the roller about the part of its peripheral surface bearing against one of the tracks. The rocking movement is brought about on the one hand by the friction between the spherical bearing surface of the arm and the corresponding internal ring and, on the other hand, by the moving of the point of contact between the bearing surface of the arm and the corresponding internal ring.

Thus, for each arm, the part of the peripheral surface of the roller which is diametrically opposite the part which is bearing oscillates between the two half-arcs forming the broken-arc profile of the track on which the peripheral surface is not bearing.

Such an oscillatory movement gives rise to friction phenomena and may even cause jamming between the roller and the track on which it is not bearing, particularly in the half-arc of the track profile located farthest toward the inside of the bell housing.

The purpose of the invention is to overcome these problems by providing a mechanical joint which can operate with an angle of misalignment with less friction and at the same time limiting the risk of jamming.

SUMMARY OF THE INVENTION

Another subject of the invention is a mechanical transmission member for a universal joint as defined hereinabove.

BRIEF DESCRIPTION OF THE DRAWINGS

The invention will be better understood from reading the description which will follow, given merely by way of example and with reference to the appended drawings, in which.

DETAILED DESCRIPTION OF THE INVENTION

Figure 1:
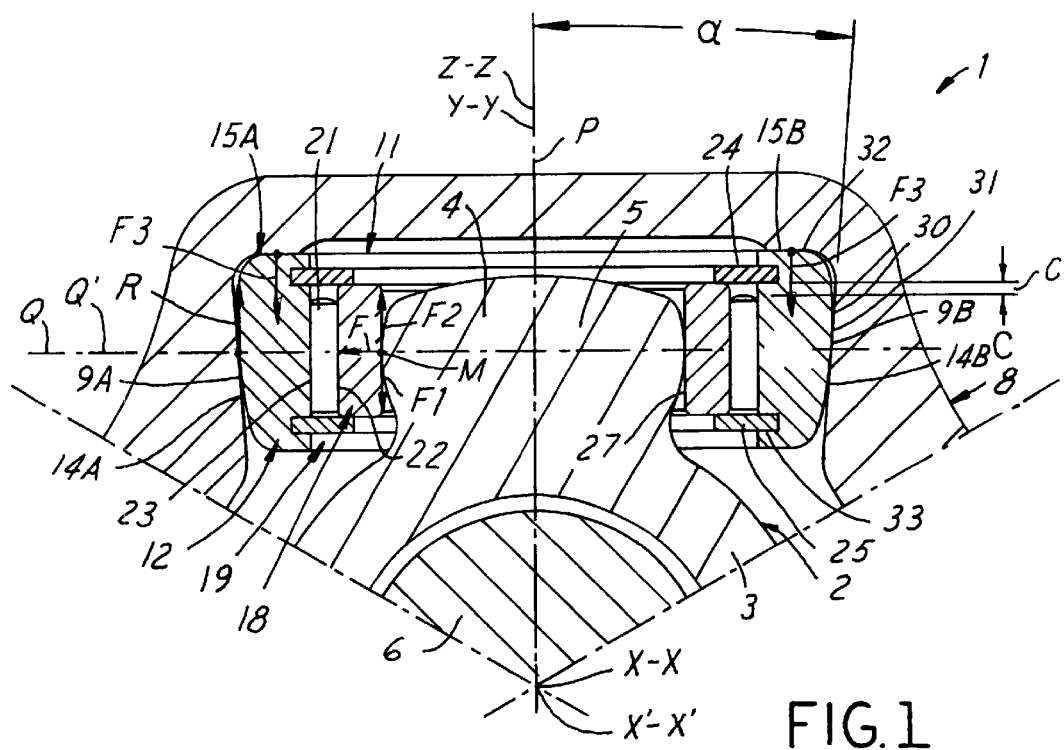
FIG. 1 is a part view in cross section of a tripot-type constant-velocity universal joint according to a first embodiment of the invention.

FIG. 1 partially illustrates a tripot-type constant-velocity joint 1 intended for a motor vehicle transmission, and essentially comprising the following components:

(1) a male element or tripod 2, with ternary symmetry with respect to a central axis X-X (orthogonal to the plane of FIG. 1), and which comprises a hub 3 and three radial arms 4 spaced angularly at 120° and just one of which is depicted. The end part of each arm 4 forms a spherical bearing surface 5 formed integrally with it and centered on the axis Y—Y of the corresponding arm 4. This male element 2 is secured to a first rotating shaft 6.

(2) a female element or bell housing 8 with ternary symmetry with respect to a central axis X'-X', the latter axis being coincident with the axis X-X when the joint is in the aligned position depicted. On each side of each arm 4, this bell housing has two tracks 9A and 9B facing each other. This female element 8 is secured to a second rotating shaft (not depicted).

(3) for each arm 4, a mechanical transmission member 11 which comprises an external roller 12 of axis of revolution Z-Z coincident with the axis Y—Y of the corresponding arm 4 in the position depicted in FIG. 1. The external roller 12 is intended to roll along one or other of the corresponding tracks 9A and 9B.

As the three mechanical transmission members 11 are identical, and because of the ternary symmetry of the male element 2 and of the female element 8, only the part of the joint 1 which is depicted in FIG. 1 will be described.

The directrix of the tracks 9A and 9B is, for example, a substantially straight line parallel to the axis X'-X'. These tracks are symmetric with respect to one another about a longitudinal and radial plane P (orthogonal to the plane of FIG. 1) of the female element 8.

Each track 9A, 9B has a central region 14A, 14B along which the roller 12 rolls and a bearing surface 15A, 15B for radially retaining the roller 12.

The central regions 14A and 14B each stretch on each side of the mid-plane Q (orthogonal to the plane P) of the tracks 9A and 9B.

The transverse profiles, that is to say the profiles as seen in a plane transversal to the axis X'-X', such as the plane of FIG. 1, of the central regions 14A, 14B of the tracks 9A, 9B are substantially straight and inclined by an angle α with respect to the longitudinal and radial plane P. The transverse profiles of the central regions 14A and 14B therefore converge radially towards the inside of the bell housing 8 at an angle substantially equal to 2α.

The transverse profiles of the bearing surfaces 15A and 15B are substantially straight and orthogonal to the longitudinal and radial plane P.

The bearing surfaces 15A and 15B are situated radially on the outside of the bell housing 8, that is to say radially on the diverging side of the transverse profiles of the central region 14A and 14B.

For each track 9A, 9B, the transverse profiles of the central regions 14A, 14B and of the bearing surfaces 15A, 15B therefore make an acute angle.

The bearing surfaces 15A, 15B and the central regions 14A, 14B of each track 9A, 9B are connected by parts which have curved transverse profiles.

The mechanical transmission member 11 comprises, on the one hand, an internal ring 18, of cylindrical overall shape with axis of revolution Z-Z, and which is arranged inside the external roller 12 and, on the other hand, means 19 of coupling the internal ring 18 and the external roller 12. These coupling means 19 comprise a needle ring 21 arranged between a cylindrical surface 22 of the ring 18 which is radially external with respect to the axis Z-Z, and a cylindrical surface 23 of the external roller 12 which is radially internal with respect to the axis Z-Z. These coupling means 19 further comprise two flat thrust washers 24 and 25 arranged on each side of the ring 18 and of the needle ring 21.

The periphery of each thrust washer 24, 25 is housed in an annular groove formed in the surface 23. The washers 24 and 25 hold the needle ring 21 and the internal ring 18 therebetween, with a small clearance C along the axis Z-Z.

The coupling means 19 therefore allow relative pivoting between the roller 12 and the ring 18 about the axis Z-Z and allow their limited relative translational movement along the axis Z-Z.

The internal ring 18 comprises a surface 27, radially internal with respect to the axis Z-Z, which is substantially cylindrical, which delimits an opening to accommodate the arm 4. The spherical bearing surface 5 of the arm 4 and the surface 27 of the ring 18 allow a swivelling and sliding movement about the axis Y—Y between the ring 18 and the arm 4.

The external roller 12 has a peripheral surface 30, radially external with respect to the axis Z-Z, which has a central region 31. This roller 12 also has a frontal surface 32 and a rear surface 33.

The central region 31, extends, in the direction of the axis Z-Z, on each side of the mid-plane Q' of the roller 12. This plane Q', orthogonal to the axis Z-Z, is substantially coincident with the plane Q in the position depicted in FIG. 1.

The tracks 9A and 9B keep the mid-plane Q' of the roller 12 substantially orthogonal to the plane P.

The central region 31 is substantially frustoconical and converges, at an angle substantially equal to 2α, toward the hub 3 of the tripod 2, that is to say in the same radial direction as the transverse profiles of the central regions 14A and 14B of the tracks 9A and 9B. The central region 31 of the roller is therefore, in meridian cross section, substantially the conjugate of the central regions 14A and 14B of the tracks 9A and 9B.

The frontal surface 32 is substantially a flat annulus of axis Z-Z. This surface 32 is situated radially on the divergent side of the region 31 of the external roller 12. The frontal surface 32 of the roller 12 is therefore, in meridian cross section, substantially the conjugate of the bearing surfaces 15A and 15B of the tracks 9A and 9B. The rear surface 33 is substantially a flat annulus of axis Z-Z and is located radially on the inside of the joint 1.

The region 31 of the external roller 12 is connected to the frontal surface 32 and rear surface 33 by parts, the profiles of which are curved in meridian cross section, of the roller 12.

The way in which the joint 1 works is as follows.

When, for example, the male element 2 is driven in the counter-clockwise direction in FIG. 1, the roller 12 comes to bear against the track 9A in order to transmit the torque to the female element 8.

The arm 4 therefore transmits to the corresponding mechanical transmission member 11 a force F parallel to the plane Q'. The point M of application of this force F is the point of contact between the bearing surface 5 and the surface 27 of the ring 18.

For each mechanical transmission member 11, the central region 14A of the track 9A and the central region 31 of the roller 12 bear against each other. The transverse profiles of these central regions means that they press together substantially flat and implies the generation of a reaction force which, because of the inclination of the transverse profiles of these central parts, has a component R directed radially toward the outside of the joint 1.

This radial component R tends to move the roller 12 radially toward the outside of the bell housing 8 until the frontal surface 32 of the roller 12 comes to bear against the bearing surfaces 15A and 15B of the tracks 9A and 9B. The surface 32 of the roller 12 comes into contact almost at right angles with the bearing surfaces 15A and 15B, which presents no risk of jamming.

When the joint 1 is operating at an angle of misalignment between the shafts of axes X-X and X'-X', the arm 4 is given a back and forth movement in radial translation with respect to the tracks 9A and 9B, in the plane P, because, on the one hand, of the inclination of the arm and, on the other hand, of the orbital movement, known as the offset, of the tripod at a frequency which is three times the rotational speed, as is well known in the art. The amplitude of this movement is greater in the direction directed radially toward the inside of the joint 1 than in the direction directed radially toward the outside of the joint 1.

When, during this back and forth movement, the arm 4 moves radially toward the inside of the joint 1 (downward in FIG. 1), the point M at which the force F is applied moves radially toward the inside of the joint 1, and so would tend to cause the roller 12 to rock in the clockwise direction in FIG. 1. In addition, during this movement, the arm 4 through friction exerts a force F1 on the internal ring 1 along the axis Z-Z, which force F1 is oriented radially toward the inside of the bell housing 8. This force F1 would also tend to cause the roller 12 to rock in the clockwise direction in FIG. 1.

The flat pressing between the peripheral surface 30 of the roller and the track 9A at their central regions 14A and 31, and the inclination of the transverse profiles of these central parts, make it possible, through the component R, to compensate for the effect of this force F1 and the movement of the point M, so that the roller 12 remains bearing against the bearing surfaces 15A and 15f of the tracks 9A and 9B.

When the arm 4 moves radially toward the outside of the joint 1 (upward in FIG. 1), the point M of application of the force F moves in the same direction. At the same time, the arm 4, through friction, exerts a force F2 on the internal ring 18 along the axis Z-Z and directed toward the outside of the bell housing 8. The movement of the point M and the force F2 tend to keep the external roller 12 bearing against the bearing surfaces 15A and 15B of the tracks 9A and 9B.

Thus, the external roller 12 remains stable, without its part facing the central region 14B of the track 9B, against which it is not bearing, oscillating.

The angle α is determined so that it just compensates for the effects of the force F1 and of the movement of the point M of application of the force F radially toward the inside of the joint 1. In this way, the reaction forces F3 exerted by the bearing surfaces 15A and 15B of the tracks 9A and 9B on the external roller 12 are limited, regardless of the direction in which the arm 3 moves.

The oscillations of the roller 12 and therefore the risks of the latter jamming when the joint 1 is operating at an angle of misalignment, are therefore limited.

Finally, the curved profiles in the parts connecting the central regions 14A and 14B to the bearing surfaces 15A and 15B of the tracks 9A and 9B make it possible to avoid high pressures at the ends of the bearing between the central region of the external roller 12 and the tracks 9A and 9B.

It should be noted that these curved profiles are obtained partly by relief-machining the ends of the central region 31 of the bearing surface 30.

In general, the angle α may be between about 1 and 10° and preferably between about 3 and 5°.

According to variants, the transverse profiles of the central regions 14A and 14B of the tracks 9A and 9B converge radially toward the outside of the bell housing 8. In the latter instances, the central part 31 of the external roller 12 also converges radially toward the outside and the marginal retaining parts of the tracks 9A and 9B are situated radially on the inside of the bell housing 8.

Figure 2:
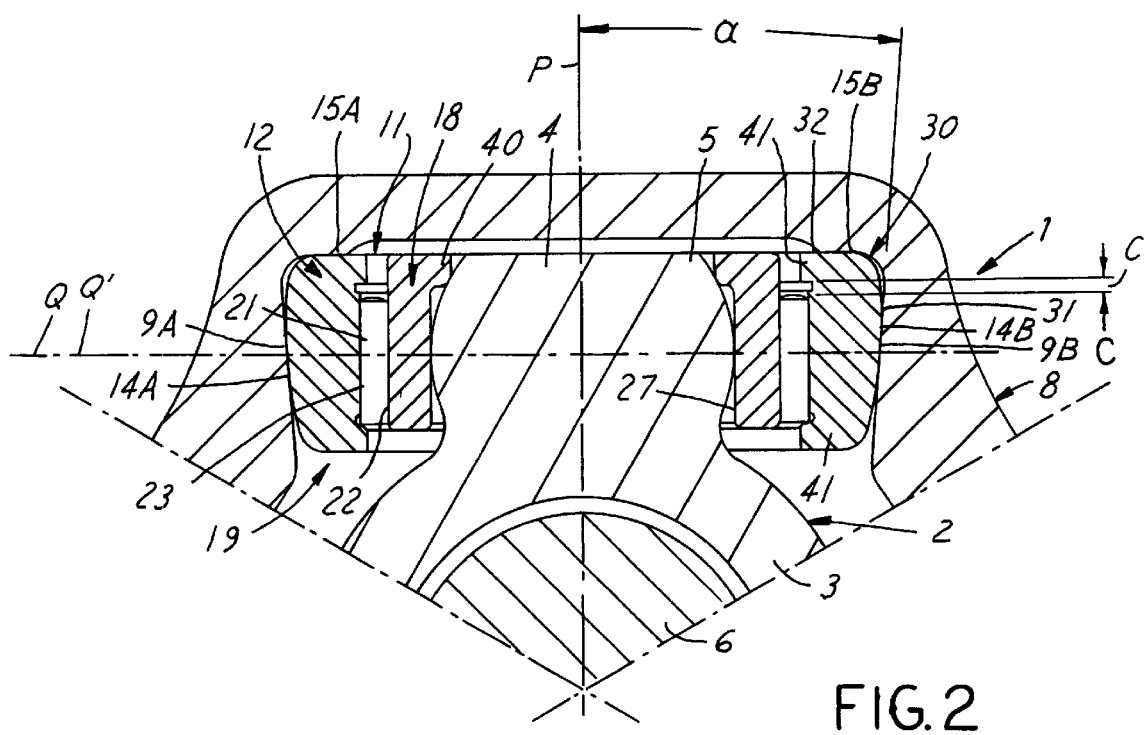
FIG. 2 is a view similar to FIG. 1, illustrating another embodiment of a tripot-type constant-velocity universal joint according to the invention.

FIG. 2 illustrates a second embodiment of a constant-velocity joint 1 according to the invention, which can be distinguished from the one illustrated in FIG. 1 as follows.

The internal ring 18 has an annular shoulder 40 of axis Z-Z on the radially internal surface 27 of this ring 18. This shoulder 40 is situated radially on the outside of the joint 1.

The length, along the axis Z-Z, of the surface 22 of the ring 18 is greater than the length of the surface 22 of the joint 1 in FIG. 1.

The surface 23 of the external roller 12 has two annular shoulders 41 of axis Z-Z, arranged on each side of the needle ring 21 along this axis.

The coupling means 19 also do not have thrust washers 24 or 25.

The coupling means 19 thus allow a pivoting movement about the axis Z-Z and a sliding movement along this axis between the external roller 12 and the internal ring 18.

In addition, the internal ring 18 swivels and slides along the axis Z-Z about the spherical bearing surface 5 of the arm 4.

The latter sliding movement is, however, limited radially toward the inside of the joint 1 by the shoulder 40 and, toward the outside, by the end 42 of the bell housing, between the bearing surfaces 15A and 15B.

The shoulders 41 of the external roller 12 allow the needle ring 21 to be held in place with respect to the roller 12.

This second embodiment makes it possible to reduce the forces transmitted by the internal ring 18 to the roller 12 along the axis Z-Z because the relative movement along this axis between the internal ring 18 and the external roller 12 is provided via the needle ring 21.

What is claimed is:

1. A constant-velocity universal joint (1) comprising:
    a male element (2) comprising several arms (4);
    a female element (8) delimiting, for each arm, a pair of tracks (9A, 9B) opposite each other, which lie respectively on each side of said arm and are symmetric with respect to a longitudinal and radial plane (P) of the female element; and,
    mounted on each arm (4), a mechanical transmission member (11) comprising an external roller (12) mounted to swivel and slide with respect to the arm and to roll along one or the other of the two corresponding tracks, tracks substantially keeping a mid-plane (Q') of tire roller perpendicular to said radial and longitudinal plane (P) and a constant distance away from a central axis (X'-X') of the female element when a driving torque is applied to one of either said male element or said female element, said mechanical transmission member (11) further comprising an internal ring (18) placed on the inside of the external roller (12), means (19) for coupling the internal ring (18) and the external roller (12) allowing the relative pivoting thereof about a common axis of revolution (Z-Z), and the internal ring (18) being mounted to pivot and slide about said arm (4),
    wherein each track (9A, 9B) comprises a central region (14A, 14B) of substantially straight transverse profile inclined by a non-zero angle (α) with respect to said longitudinal and radial plane (P), and, a bearing surface (15A, 15B) for radially retaining the roller (12), the bearing surface lying radially on a diverging side of said central regions (14A, 14B), and
    wherein the roller (12) comprises a peripheral surface having a central region (31), said central region (31) being substantially conical and, in meridian cross section, the conjugate of the central regions (14A, 14B) of said tracks, and a frontal surface (32) adapted to come into contact with both said bearing surfaces (15A, 15B) of the tracks (9A, 9B) under the effect of a driving torque when the driving torque is applied to one of either said male element or said female element so that a force between said frontal surface (32) and said bearing surfaces (15A, 15B) resulting from the driving torque is perpendicular to said frontal surface (32) and said bearing surfaces (15A, 15B).

2. The joint as claimed in claim 1, wherein the frontal surface (32) of the roller (12) in meridian cross section is substantially the conjugate of the bearing surfaces (15A, 15B) of the tracks.

3. The joint as claimed in claim 1, wherein the transverse profiles of said central regions (14A, 14B) of the tracks converge radially towards an inside of the a female element (8) of the joint (1).

4. The joint as claimed in claim 1, wherein the non-zero angle (α) is between about 1° and 10°.

5. The mechanical joint as claimed in claim 1, wherein said bearing surfaces (15A, 15B) of the tracks (9A, 9B) each have a substantially straight transverse profile.

6. The joint as claimed in claim 1, wherein the transverse profiles of said bearing surfaces (15A, 15B) of the tracks (9A, 9B) are substantially orthogonal to the corresponding longitudinal and radial plane (P).

7. The joint as claimed in claim 1, wherein said roller (12) can slide with respect to the internal ring (18) along an axis of revolution of the roller (Z-Z).

8. The joint as claimed in claim 1, wherein the internal ring (18) has an internal relief (40) which limits its sliding towards the central axis (X-X) of the male element (2) of the joint.

9. The joint as claimed in claim 1, wherein the non-zero angle ($\alpha$) is between about 3° and 5°.

10. The joint as claimed in claim 1, wherein the internal ring (18) is mounted for universal swiveling and sliding about arm (14).

11. The joint as claimed in claim 1, wherein the frontal surface of roller (12) is a flat annular.

12. A mechanical joint having a male element (2) comprising several arms (4), a female element (8) delimiting, for each arm, a pair of tracks (9A, 9B) opposite each other, which lie respectively on each side of said arm and are symmetric with respect to a longitudinal and radial plane (P) of the female element, and a mechanical transmission member (11) mounted on each arm, said mechanical transmission member (11) comprising:

an external roller (12) mounted to swivel and slide with respect to the arm and to roll along one or the other of the two corresponding tracks, tracks substantially keeping a mid-plane (Q') of the roller perpendicular to said radial and longitudinal plane (P) and a constant distance away from a central axis (X'-X') of the female element when a driving torque is applied to one of either said male element or said female element, said mechanical transmission member (11) further comprising an internal ring (18) placed on the inside of the external roller (12), means (19) for coupling the internal ring (18) and the external roller (12) allowing the relative pivoting thereof about a common axis of revolution (Z-Z), and the internal ring (18) being mounted to pivot and slide about said arm (4), wherein each track (9A, 9B) comprises a central region (14A, 14B) of substantially straight transverse profile inclined by a non-zero angle ($\alpha$) with respect to said longitudinal and radial plane (P), and, a bearing surface (15A, 15B) for radially retaining the roller (12), the bearing surface lying radially on a diverging side of said central regions (14A, 14B), and wherein the roller (12) comprises a peripheral surface having a central region (31), said central region (31) being substantially conical and, in meridian cross section, the conjugate of the central regions (14A, 14B) of said tracks, and a frontal surface (32) adapted to come into contact with both said bearing surfaces (15A, 15B) of the tracks (9A, 9B) under the effect of a driving torque when the driving torque is applied to one of either said male element or said female element so that a force between said frontal surface (32) and said bearing surfaces (15A, 15B) resulting from the driving torque is perpendicular to said frontal surface (32) and said bearing surfaces (15A, 15B).

* * * * *